United States Patent [19]

Klein et al.

[11] 4,379,664
[45] Apr. 12, 1983

[54] SEED CUP ASSEMBLY

[75] Inventors: Merv V. Klein; Dan W. Kelm; Salah U. Din, all of Winnipeg, Canada

[73] Assignee: Prasco Super Seeder Ltd., Winnipeg, Canada

[21] Appl. No.: 189,565

[22] Filed: Sep. 23, 1980

[30] Foreign Application Priority Data

Jul. 11, 1980 [CA] Canada ................................... 356042

[51] Int. Cl.³ ............................................ B65G 53/46
[52] U.S. Cl. .................................... 406/68; 222/263; 222/311; 222/368; 222/630; 222/636
[58] Field of Search ................... 221/4, 211, 266, 277, 221/278; 222/263, 311, 368, 410, 414, 630, 636; 406/128, 52, 62, 65, 68

[56] References Cited

U.S. PATENT DOCUMENTS

| | | | |
|---|---|---|---|
| 1,319,348 | 10/1919 | Kinter | 406/68 |
| 1,844,172 | 2/1932 | Moore | 406/68 |
| 1,882,861 | 10/1932 | Moore | 406/68 |
| 1,965,498 | 7/1934 | Kletetschka | 406/68 |
| 3,233,790 | 2/1966 | Mogi | 222/263 X |
| 3,888,387 | 6/1975 | Deckler | 221/278 |

FOREIGN PATENT DOCUMENTS

| | | | |
|---|---|---|---|
| 435806 | 10/1926 | Fed. Rep. of Germany | 406/68 |
| 2334396 | 1/1975 | Fed. Rep. of Germany | 222/263 |

*Primary Examiner*—Allen N. Knowles
*Attorney, Agent, or Firm*—Parkhurst & Oliff

[57] ABSTRACT

The metering cup assembly is disclosed for use in combination with a pneumatic seeding or fertilizing device. The assembly includes a casing which is secured to the underside of a hopper carrying seed, fertilizing or other granular material and the assembly is connected into a conduit in the pneumatic system. A metering component is journalled for rotation in the casing and provides a metering passageway for seed or other granular material therefrom the hopper into the pneumatic passageway. The metering device is adjustable to control the quantity of the material being transferred from the hopper into the conduit.

1 Claim, 6 Drawing Figures

SEED CUP ASSEMBLY

BACKGROUND OF THE INVENTION

Seed cup assemblies are used in combination with seeding implements in order to meter seed or granular fertilizer through tubes and into the ground. Their use is normally combined with some form of ground opening device. Seed cup assemblies are used with pneumatic seeders and, in the present application, each of the large hoppers uses one seed cup assembly for metering seed into the air stream of the pneumatic system which blows the seed to the location of the ground openers through a network of flexible hoses. Conventional seed cup assemblies have proven to be unsatisfactory when used with the pressurized pneumatic seeders, primarily due to the problem of seeds leaking under pressure from the cup housing and into the air stream of the system.

SUMMARY OF THE INVENTION

The seed cup assembly in the present invention is particularly suitable for use with pneumatic seeders and according to a broad aspect, the invention relates to a seed cup assembly for use with a pneumatic seeding system and adapted for attachment to the underside of a pressurized hopper; comprising in combination a casing, a conduit secured to and in communication with the casing and adapted for insertion into the pneumatic system, a metering component journalled for rotation within the casing and providing passage for seed or the like between the hopper and said conduit; the metering component being adjustably positioned within the casing for controlling the quantity of granular material transferred from the hopper to the conduit.

Another feature of the present invention is the provision of the seed cup assembly which include means by which to prevent blow back of air through the assembly conduit and into the hopper.

BRIEF DESCRIPTION OF THE DRAWINGS

The invention is illustrated by way of example in the accompanying drawings in which.

DETAILED DESCRIPTION OF THE INVENTION

Figure 1:
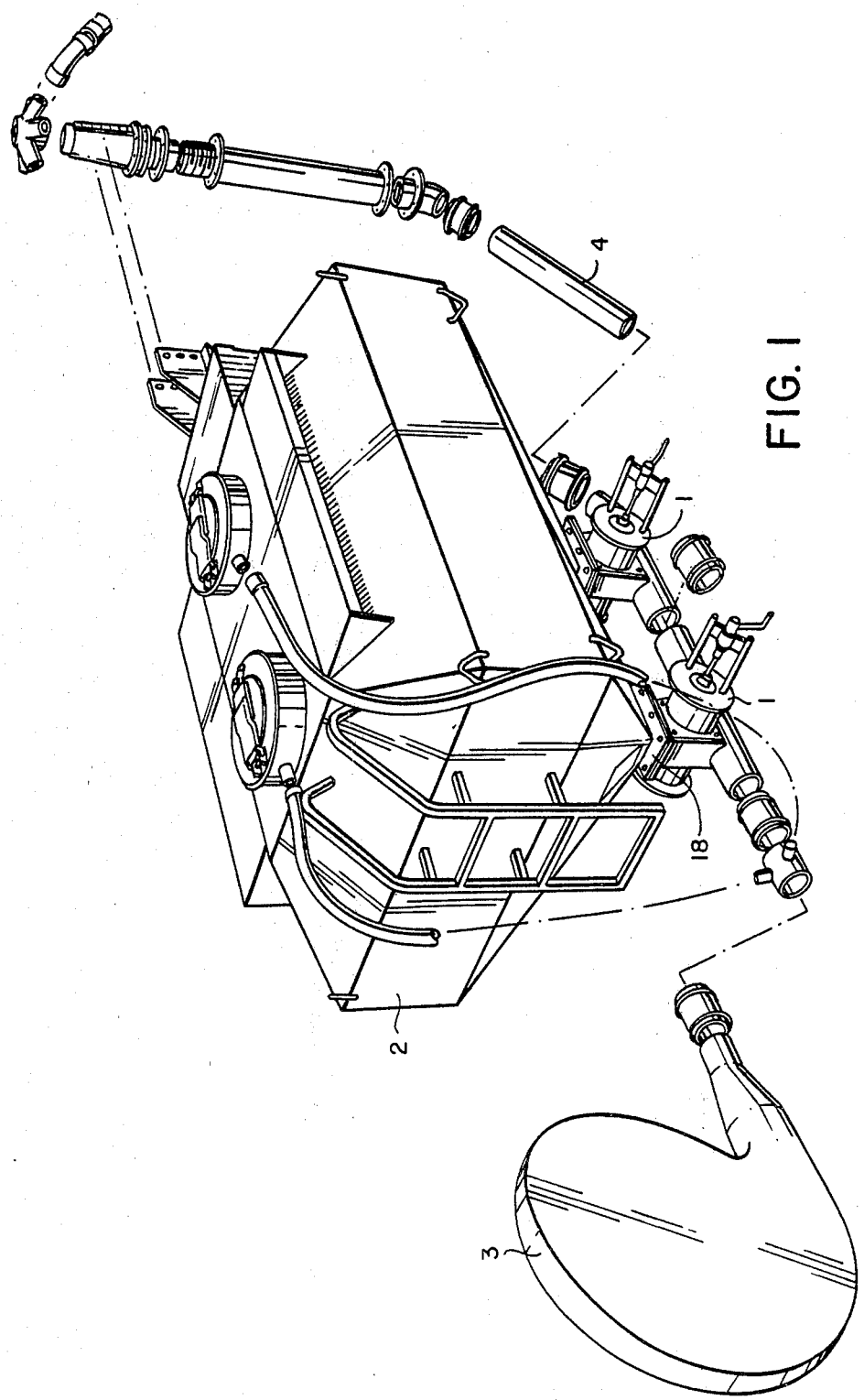
FIG. 1 is a perspective view of a twin seed hopper mounted on two seed cup assemblies (metering cup assemblies) of the present invention.

Referring to FIG. 1, the seed cup assembly generally indicated at 1 is secured to the lower end of the pressurized hopper 2 and is connected into a pneumatic seeding system between a blower 3 and a conduit 4 which leads to one or more seed distributing heads.

Figure 2:
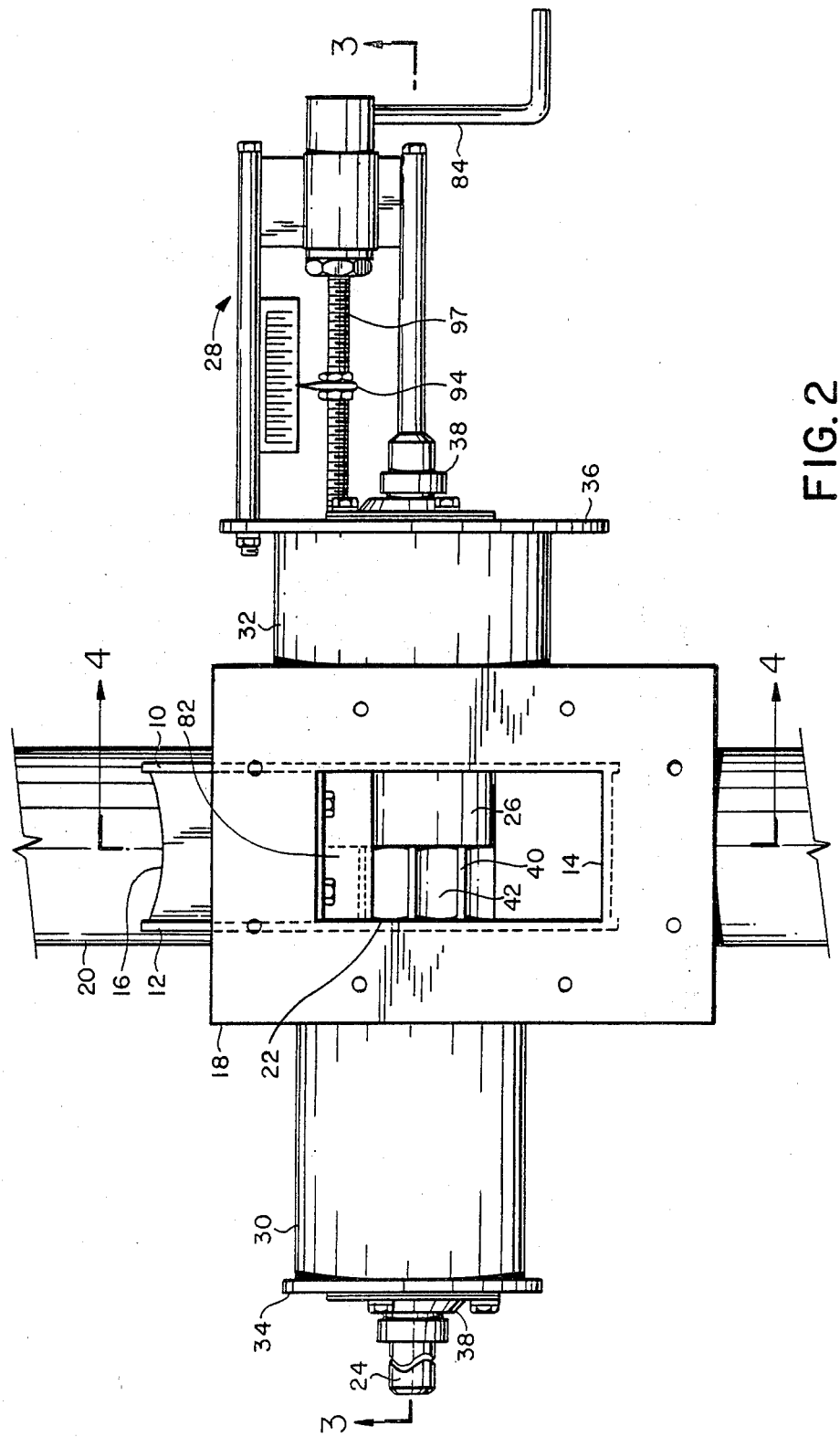
FIG. 2 is a plan view of the seed cup assembly looking down into the confines thereof.

Referring to FIG. 2, the assembly 1 includes a casing having side walls 10 and 12, end wall 14 and a forwardly sloping end wall 16. The upper end of the casing is provided with rectangular flange 18 for detachably connecting the casing to the lower end of the hopper 2.

The lower end of the casing is welded to a tubular member 20. As seen in FIG. 2, the inner part of the casing contains a seed metering device in the form of a fluted cylinder 22 mounted on and rotated by a shaft 24 which extends completely through the assembly 1 and which also supports a non-rotatable cylindrical slider 26 mounted adjacent to the fluted cylinder 22. FIG. 2 shows the fluted cylinder approximately half exposed within the casing, this exposure being governed by an adjustment mechanism indicated generally at 28 and which, when actuated, moves the slider 26 and fluted cylinder 22 longitudinally along a shaft 24. Cylindrical side housings 30 and 32 secured to and extending outwardly from the sides of the casing provide the required room for reciprocal movement of members 22 and 26 as will be appreciated from FIG. 3. Shaft 24 can be rotated by sprockets chain driven from associated implement or can be rotated in any other suitable manner. Shaft 24 is mounted for rotation in the end walls 34 and 36 or housing 30 and 32 respectively by means of bearings 38.

Figure 3:
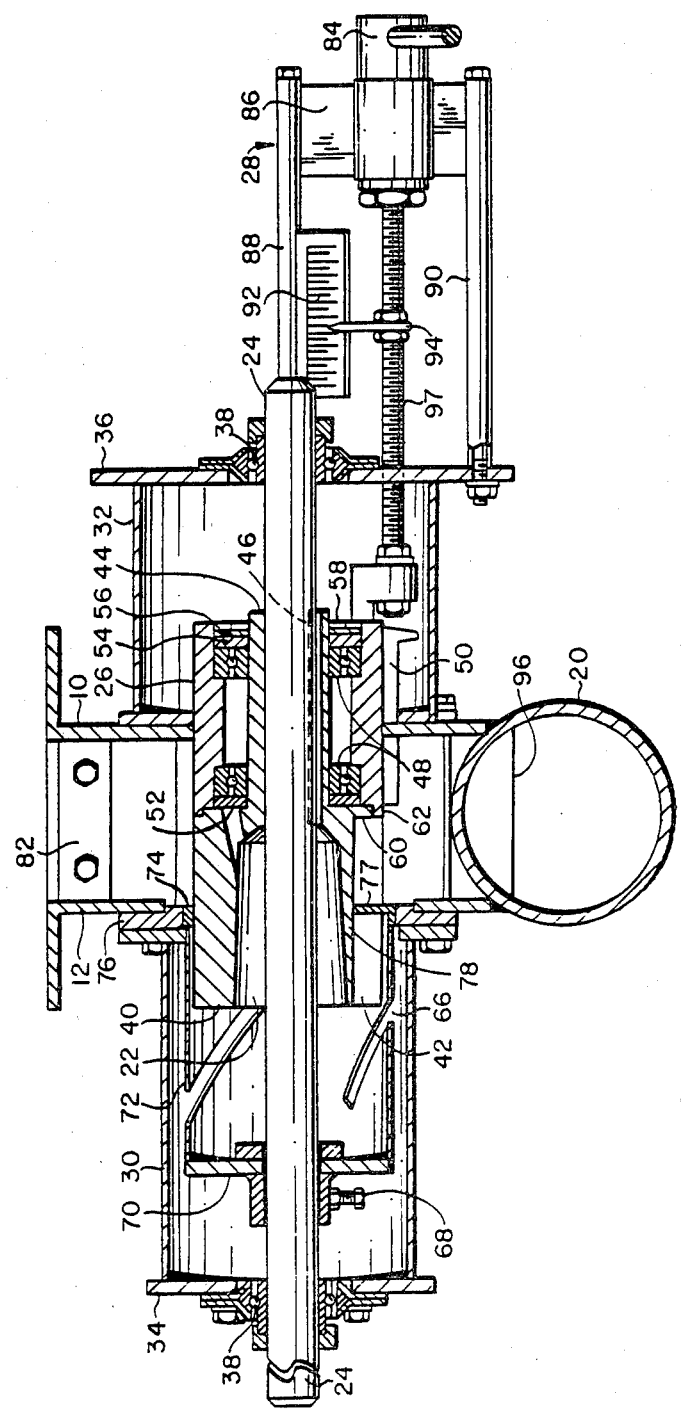
FIG. 3 is a cross-section taken along the line 3—3 of FIG. 2.

Seed or other granular material from the pressurized hopper moves down and into the confines of the casing and, through the rotary action of the fluted cylinder 22, is deposited in the conduit 20 to be pneumatically discharged into the delivery system. As the seed is under pressure from the hopper, the fluted cylinder 22 and the slider 26 have to be extremely well sealed between their surfaces and those of the side plates 10 and 12 of the casing to prevent leakage of seed or other granular material between the surfaces to reduce the possibility of wear between the surfaces and prevent grinding action of the granular material between those surfaces. One of the advantages of the construction of the present invention is that it prevents direct and forced contact of the granular material into any clearance space between the fluted cylinder 22 and the slider 26. This construction is illustrated in FIG. 3 which shows the fluted metering device 22 having a serrated surface in cross-section (FIG. 4) formed by the blade 40 and the semi-circular valleys 42 therebetween. The fluted cylinder 22 has an elongated portion 44 of reduced diameter which is connected to the shaft 24 by means of a key 46 and which also serves to mount the cylindrical slider 26 by virtue of a pair of bearings 48. As mentioned previously, the cylindrical slider 26 does not rotate and besides the bearings 48, such rotation is prevented by means of a slider guide 50 which engages a slot, not shown, in the side wall 10 of the casing. The bearings 48 are protected from granular materials through the provision of end seals 52 and 54, the latter being held in place by flat washers 56 and a snap ring 58.

It will be seen from FIG. 3 that the fluted portion of cylinder 22 has a projecting rim 60 which is recessed within a flange 62 on the slider 26 so as to prevent direct contact of granular material into the clearance space between the flute and the slider. Any material that does get into the small void between the rim 60 of the flute cylinder and the flange 62 of the slider can escape by means of a lateral aperture 64 in the flute cylinder 22 to eventually drop within the confines of the side housing 30.

Figure 6:
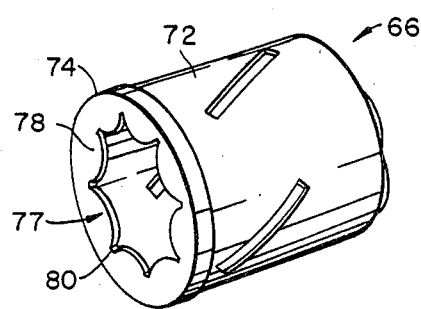
FIG. 6 is a perspective view of part of the disc assembly.
Figure 5:
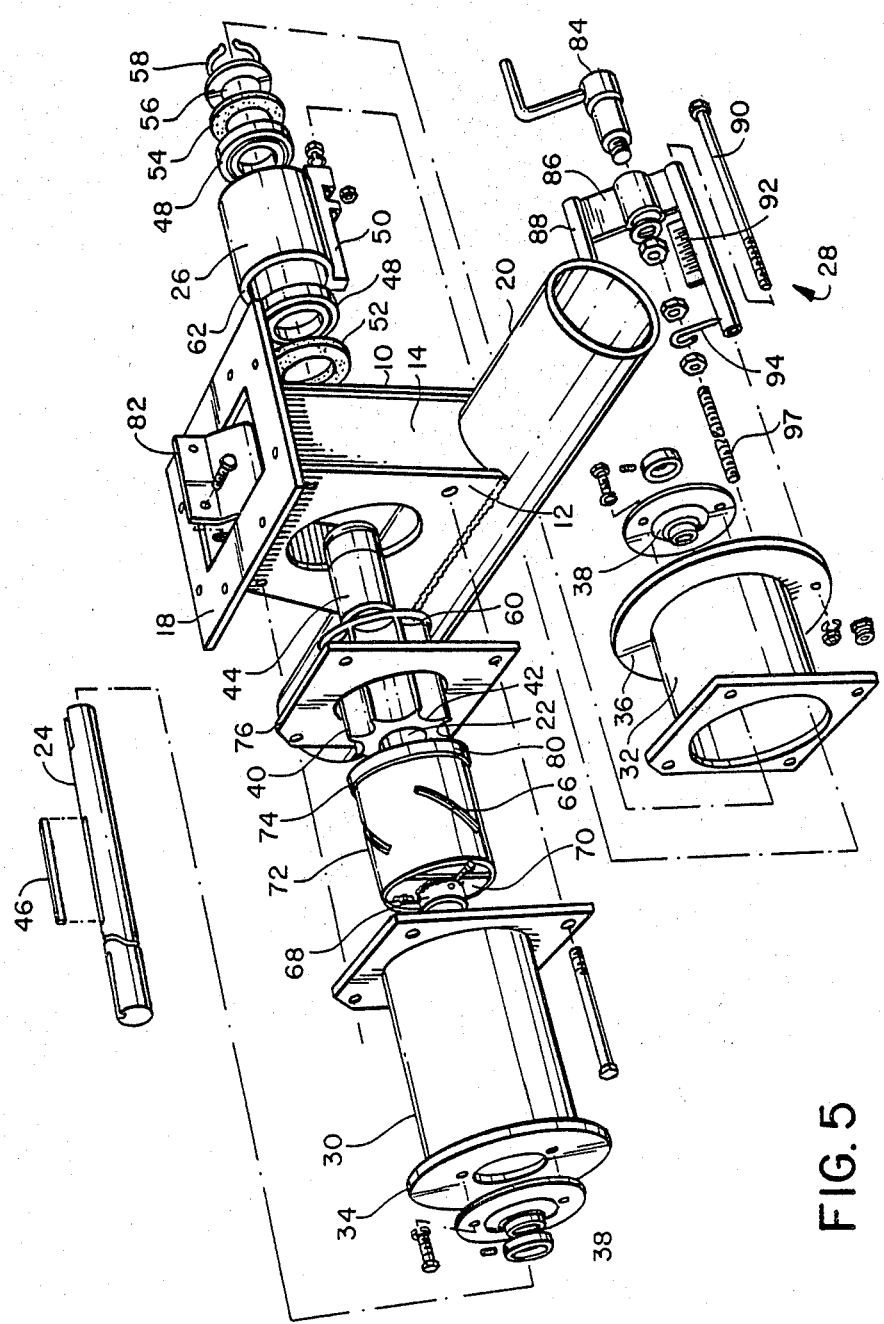
FIG. 5 is a perspective exploded view of the assembly and its components.

There is insufficient clearance between the aperture and the side wall 10 of the casing and the outer surface of the cylindrical slider 26 to allow passage of seed under pressure to pass therethrough. However, due to the irregular surface of the fluted cylinder 22, a special seal must be provided to prevent passage of seed under pressure from the mouth portion of the casing through the side wall thereof. Accordingly, a disc assembly 66 is secured by a set screw 68 to the shaft 24 and includes an end 70 and a cylindrical wall portion 72 terminating in the seal 74 between the outer surface of the flute cylinder 22 and a spacer plate 76 which is secured to the side wall 12 of the casing in the mounting of the side housing 30. Seal 74, as shown in FIG. 6 has an inner ring of serrations 77 made up of inwardly projecting, semi-circular portions 78, the contour of which mates with the contour of the valley 42 between each flute 22 and the cylinder thereof. Between each projecting member 78 there is a flat portion 80 which engages the outer surface of each peak 40 between the valleys 42. It will be evident from FIG. 3 that the disc assembly 66 is prevented from longitudinal movement along the shaft 24 due to its connection thereto at 68 and it will be also evident that the assembly 66 rotates with the fluted cylinder 22 when the shaft 24 is rotated. It will also be evident that the fluted cylinder 22 can move backward and forward on the shaft 24, the surfaces of engagement between the fluted cylinder and the disc assembly 66 effecting a seal preventing seed from blowing therethrough.

The adjustment means 28 effects longitudinal movement of the fluted cylinder 22 and slider 26 along the shaft 24 and this mechanism includes a threaded rod 97 having a crank 84 secured to its outer end, its inner end being secured in a slide guide 50. A cross head 86 interconnects a pair of tubular members 90 connecting the cross head to the end plate 36. A seed rate scale 92 is mounted on member 88 and the threaded rod 97 is provided with an adjustable pointer 94 providing the user with an indication of the amount of seed being metered into the pneumatic system.

Figure 4:
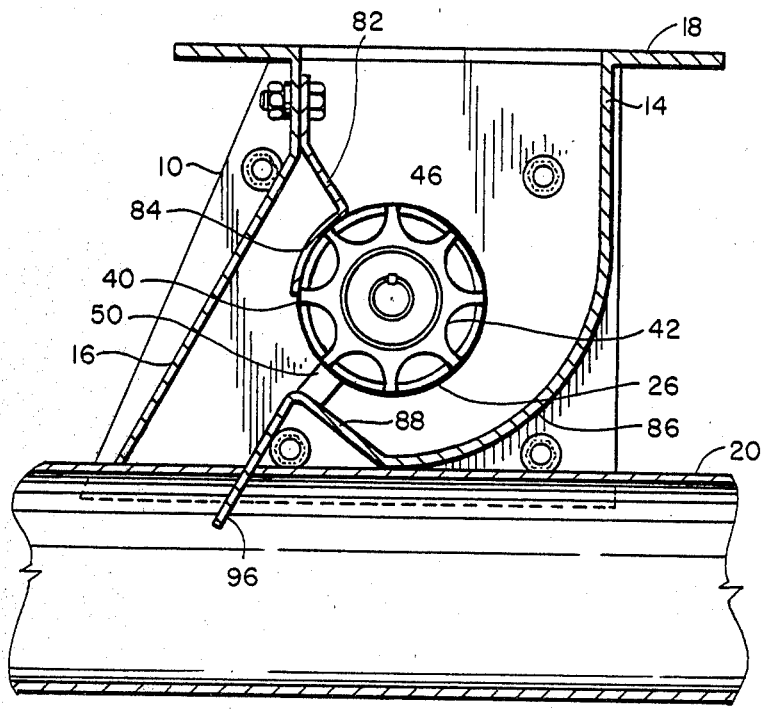
FIG. 4 is a cross-sectional view in elevation taken through the assembly.

Referring now to FIG. 4, the casing 10 includes a deflector plate 82 which, is shown in FIG. 2, extends across the width of the casing and is provided with a curved portion 84 which is so positioned as to provide appropriate clearance between its surface and that of the peaks 40 of the fluted cylinder 22. Plate 82 deflects seed or granular material coming into the mouth of the casing from the hopper towards the rear wall 14 of the casing where the flutes of the cylinder 22 carry it in a circular path around the curved portion 86 towards conduit 20. The gate 50 of the slide cylinder 26 moves across the opening between the surface of the cylindrical slider and the floor of the casing so that the seed must pass between the terminal edge of the gate 50, the side wall 12 of the casing and the floor thereof. Obviously, when the gate and slider 26 are moved completely to the left as in FIG. 3, there is no communication whatsoever between the upper part of the casing and the conduit 20.

The casing is provided, adjacent the conduit 20 with a further deflector plate having a straight portion 88 to deflect the seed upwardly and forwardly and a downwardly directed portion 96, the terminal end of which extends into the confines of the conduit 20 so as to cause an area of negative pressure at this exit point.

As seed is brought around by the flutes of the cylinder 22 and past the gate 50, they are drawn into the exit area E by the negative pressure therein and carried away by the pneumatic pressure in the conduit 20.

While the invention has been described in connection with a specific embodiment thereof and in a specific use, various modifications thereof will occur to those skilled in the art without departing from the spirit and scope of the invention as set forth in the appended claims.

The terms and expressions which have been employed in this disclosure are used as terms of description and not of limitation and there is no intention in the use of such terms and expressions to exclude any equivalents of the features shown and described or portions thereof, but it is recognized that various modifications are possible within the scope of the invention claimed.

We claim:

1. A seed cup assembly for use with a pneumatic seeding system and adapted for attachment to the underside of a pressurized hopper, comprising in combination a discharge casing; a conduit secured to and in communication with the lower end of said casing and adapted for insertion into the pneumatic system; a rotatable shaft extending transversely through said casing; a metering component journalled for rotation by said shaft and communicating with said casing and providing passage for granular material between said hopper and said conduit; said metering component being adjustably positioned within said casing for controlling the quantity of granular material transferred from the hopper to the conduit; said metering component comprising a cylindrical body having a plurality of elongated flutes thereon, said flutes engaging material within the hopper and depositing said material into the conduit as the metering component rotates within the casing; means sealing the fluted cylinder of the assembly with an adjacent wall of the casing; means for moving the fluted metering component along said shaft to increase the exposure of the fluted surface to the inside of the casing, said metering component including an elongated portion of reduced diameter extending concentrically outwards from the cylindrical fluted boday; and a cylindrical slider freely and coaxially mounted on said elongated portion adjacent to said fluted cylinder and providing sealing means with the adjacent wall of the casing; means sealing the fluted cylinder comprising a cylindrical housing of greater diameter than said fluted cylinder, one end wall of said housing being secured to said rotatable shaft whereby the cylindrical housing is coaxially positioned over the portion of the fluted cylinder extending through the casing wall; and a disc shaped member at the other end of said cylindrical housing and having a peripheral outer surface providing the seal against the casing wall, and an inner surface profiled to match the fluted surface of the metering cylinder.

* * * * *